United States Patent [19]

Shyr

[11] Patent Number: 4,547,486

[45] Date of Patent: Oct. 15, 1985

[54] CATALYST AND METHOD OF PREPARING CATALYST

[75] Inventor: Yen-Shin Shyr, Bartlesville, Okla.

[73] Assignee: Phillips Petroleum Company, Bartlesville, Okla.

[21] Appl. No.: 637,623

[22] Filed: Aug. 3, 1984

[51] Int. Cl.[4] .......................... B01J 21/04; B01J 23/44
[52] U.S. Cl. .................................... 502/333; 502/305; 502/324; 502/330; 502/332; 502/334; 502/335; 502/336; 502/340; 502/349; 502/353; 502/355
[58] Field of Search ............... 502/332, 333, 334, 335, 502/336, 305, 324, 330, 340, 349, 353, 355

[56] References Cited

U.S. PATENT DOCUMENTS

| | | | |
|---|---|---|---|
| 2,746,936 | 5/1956 | Plank | 252/465 |
| 3,775,346 | 11/1973 | Calcagno et al. | 502/334 |
| 4,404,124 | 9/1983 | Johnson et al. | 252/466 PT |

*Primary Examiner*—W. J. Shine
*Attorney, Agent, or Firm*—Mark A. Montgomery

[57] ABSTRACT

Surface impregnated catalysts or skin catalysts where the catalytically active material is concentrated in the outer surface of the support particles are prepared by filling the support particles with a pre-fill liquid followed by an active material containing impregnating solution that is not miscible with and has a lower surface tension than the pre-fill liquid.

21 Claims, No Drawings

CATALYST AND METHOD OF PREPARING CATALYST

BACKGROUND

This invention relates to new surface impregnated catalysts or skin catalysts as well as a method for making such catalysts.

Catalysts comprising one or more catalytic components supported on suitable carrier or support materials have been employed in a wide variety of industrial operations, such as olefin hydrogenation, isomerization, etc.

Previous methods of preparing such supported catalysts have generally involved soaking the porous support with a solution of catalytic material until the support is substantially saturated with impregnating solution, after which the resulting product is dried and/or calcined and/or chemically reduced to yield a porous mass having a catalytically active material distributed throughout the pores of the support material. Variations of the general procedure have included such as the distribution of a metal containing impregnating solution through all the pores of the carrier, and then reducing the metallic catalytic material that is deposited through all the pores. In the above described preparation, it was deemed advantageous to have the catalytic active material distributed uniformly throughout the porous support.

Some later developments were focused on the controlling of the process of impregnating the catalytically active material into relatively restricted zones located within the support. Impregnating the support material in restricted zones as described in U.S. Pat. No. 2,746,936 is accomplished by the process of (a) partially filling the porous carrier with an inert liquid to physically occupy the filled pores serving to block off such pores during subsequent contact with the impregnating solution. The two liquids are required to be substantially immiscible irrespective of other physical parameters such as surface tension.

A certain type of zoned catalyst called a "skin catalyst" has very desirable properties. Skin catalysts are catalysts where the active material is concentrated near the skin or outer surface of the support material. When the catalytically active material is concentrated near the surface of the support it is in the area where most catalytic activity is carried out and not buried and wasted in the core of the support. These skin catalysts would seem to be most useful as catalysts when used to catalyze materials that do not fully penetrate through to the core of the support or when the reaction in the core of the catalyst is not desirable.

An object of this invention is to provide a catalyst and process of making the catalyst.

A further object is to provide a catalyst and process of making the catalyst whereby the use of the active material in the support is maximized.

Another object of this invention is to provide a skin type catalyst.

Still another object of this invention is to provide an improved process of preparing a skin type catalyst.

INVENTION

It has recently been discovered that improved catalyst can be made by first immersing a support material in a pre-fill liquid to fill the support, followed by impregnating with an active material containing impregnating solution that is not miscible with and has a lower surface tension than the pre-fill liquid. This prevents the impregnating solution from penetrating past the surface of the support and after drying and treatment the active material is concentrated in the skin or outer surface of the support.

CATALYST SUPPORT

Any porous material that is useful for supporting catalytically active material is contemplated as being useful for this invention. Such supports include, but are not limited to, silica, metal silicates, chemically combined metal oxides, metal phosphates, alumina, silica-alumina, aluminosilicates (e.g. zeolites and clays), $P_2O_5$-alumina, $B_2O_3$-alumina magnesium oxide, calcium oxide, lanthanium oxide, cerium oxides ($Ce_2O_3$, $CeO_2$), thorium dioxide, titanium dioxide (titania), titania-alumina, zirconium dioxide, aluminum phosphate, magnesium phosphate, calcium phosphate, cerium phosphate, thorium phosphate, zirconium phosphate, zinc phosphate, zinc aluminate, zinc titanate and the like and mixtures of any two or more thereof, alumina being the most preferred.

Any suitable alumina can be employed such as alpha aluminas which will result in a catalyst having an alpha alumina support. Typical alpha aluminas have surface areas in the range of about 3 to about 7 square meters per gram, pore volume of about 0.24 to about 0.34 cubic centimeters per gram, and a mean pore radius in the range of about 685 to about 2270 Angstrom units.

These characteristics of the alpha alumina can be determined using the following methods on samples of the alumina that has been degassed at room temperature for 30 minutes at a pressure of $10^{-3}$ mm or less:

(1) The surface area is found by the well-known method of Brunauer, Emmett, and Teller by measuring the quantity of argon adsorbed on the catalyst at $-183°$ C. with the cross-sectional area of the argon atom being taken as 14.4 square Angstrom units.

(2) Determining the pore volume involves determining the "mercury density" and the "helium density". The mercury density is determined by immersing the support in mercury at 20° C. and 900 mm pressure, under which conditions about 15 minutes are allowed for attainment of equilibrium. The helium density is determined by immersing the support in helium at room temperature. The pore volume per gram is found by subtracting the reciprocal of the "helium density" from the reciprocal of the "mercury density."

(3) The mean pore radius is determined by the formula $$r=(2V/A)$$

where r is the mean pore radius, V is the pore volume, and A is the surface area. If V is expressed in cubic centimeters and A is expressed in square centimeters, the mean radius r is in centimeters and should be multiplied by $10^8$ to give the mean radius in Angstrom units.

ACTIVE MATERIAL

Any active material that can be used as the active catalyst component is considered useful for this invention provided it is the type that can alone or in combination with other materials, e.g., as a salt such as acetate or chloride, be dissolved in the lower surface tension impregnating solution and will deposit onto the carrier or support, preferably about 0.1 g active material in about 3 ml impregnating solution per 10 g support.

Metals contemplated useful for this invention are transition metals, those in the sub groups III B, IV B, V B, VI B, VII B, VIII, I B and II B of the Periodic Table of the Elements as per Webster's Third New International Dictionary 1971, page 1680, the preferred group being VIII containing iron, cobalt, nickel, platinum and palladium.

The finished catalyst particles can be of any suitable shape and dimension, however, the advantage of the skin type catalyst are particularly notable for those particles having minimum dimensions of at least about 1 mm. A particularly suitable form of catalyst particle is one having dimensions in the range of about 1-6 mm.

PRESOAK LIQUID AND IMPREGNATING SOLUTION

The presoak or pre-fill liquid has a surface tension at 20° C. of at least about 5 dynes/cm higher than that of the impregnating metal salt solution. Preferably, the presoak liquid has a surface tension at 20° C. of about 40-90 dynes/cm and the impregnating solution has a surface tension at 20° C. of about 15-60 dynes/cm. More preferably, the presoak liquid has a surface tension at 20° C. of about 45-75 dynes/cm and the impregnating solution has a surface at 20° C. of about 20-35 dynes/cm. The presoak liquid and the impregnation of solution need to be substantially immiscible with each other.

Typical presoak liquids contemplated for use in this invention are usually polar and are as follows but are not limited to: water, alcohols, such as methanol, ethanol, amyl alcohol, glycol, glycerin, and the like and mixtures thereof.

Typical solvents for preparing impregnating solutions contemplated for use in this invention are as follows but are not limited to: aromatic hydrocarbons, such as benzene, toluene, xylenes, etc.; halogenated organic compounds, such as carbon tetrachloride, chlorobenzene, dichloromethane, chloroform, ethylene chloride, etc.; ketones, such as acetone and methylethylketone; aldehydes, such as acetaldehyde; ethers, such as ethylethers, and the like, and mixtures thereof. An important embodiment in this invention is that the lower surface tension impregnating solution is substantially immiscible with the presoak liquid.

After the skin catalyst is prepared by presoaking the suitable catalyst support material with a liquid of high surface tension and then impregnating the presoaked support material with the solution of the active catalyst component dissolved in a liquid of low surface tension, the solvent needs to be evaporated from the impregnated catalyst support. Any suitable method of drying can be used for this invention, however, to avoid diffusion of the catalytic material into the center of the support it is preferred to dry the material under reduced pressure, more preferably at at least about 200° F. for at least about one hour.

These catalysts can be used for a wide variety of operations depending on the catalytically active material and method of treatment after drying. These skin catalysts can be used for the same operation as their non-skin catalyst counterparts, however, the active material in the skin catalyst would not be wasted in the core. Such catalysts are useful for promoting hydrogenation, dehydrogenation, desulfurization, dehydrocyclization, isomerization, reforming, cracking, and the like.

The dried catalyst can be treated with hydrogen at elevated temperatures (preferably at at least about 450° F. for at least about 2 hours) to reduce the metal ions to the metal, calcinated with oxygen under elevated temperatures, or sulfided with $H_2S$ under increased temperatures. Other treatments can also be employed depending upon the desired use of the skin catalyst.

EXAMPLE I

In control runs described in this example a porous material (suitable as a catalyst support) was presoaked with liquids having low surface tension and was then impregnated with an aqueous solution of a noble metal (suitable as catalyst component). Alumina DD pellets (supplied by Mallinckrodt, Inc., St. Louis, Mo.) having an average particle size of about 1.25 mm, a surface area of about 9 m$^2$/g, (determined by BET/N$_2$ method) and a pore volume of about 0.35 cc/g (determined by H$_2$O absorption at room temperature and atmospheric pressure) were presoaked by submersion for about 1 hour, at room temperature, in four organic liquids of low surface tension $\gamma$: a commercially available mixture of o-, m-, p-xylenes ($\gamma$ at 20° C. about 29 dynes/cm); benzene ($\gamma$ at 20° C.: about 29 dynes/cm); dichloromethane ($\gamma$ at 20° C.: about 27 dynes/cm), and chloroform ($\gamma$ at 20° C.: about 27 dynes/cm). The slurries were then filtered and the presoaked alumina pellets were blotted with paper towels so as to remove the greatest portion of the adhering liquids. The inside pores of the alumina were essentially filled with liquid as was observed after splitting of several pellets. About 10 grams of thus treated alumina pellets were then impregnated with an aqueous solution of $PdCl_2$ (pH:1; concentration: about 0.111 M Pd; $\gamma$ of $H_2O$ at 20° C.: about 73 dynes/cm). The slurry was heated on a hot plate and stirred. At one minute intervals several $Al_2O_3$ pellets were withdrawn, split in half by means of a sharp knife and examined for yellow coloration (due to penetrated $PdCl_4{}^{2-}$ ions).

The results were: $PdCl_4{}^{-2}$ ions penetrated to the core of all examined presoaked $Al_2O_3$ pellets and were substantially uniformly distributed inside the pellets within about 5 minutes. The time of penetration of $PdCl_4{}^{-2}$ to the core of dry alumina pellets that were not presoaked was comparable: about 3 minutes. These test results showed that presoaking of alumina with low surface tension liquids did not prevent the penetration of metal compounds such as $PdCl_4{}^{-2}$, dissolved in an immiscible high surface tension liquid such as water, to the core of the alumina particles. No preferred accumulation of $PdCl_4{}^{-2}$ in the skin region of $Al_2O_3$ particles was observed. Therefore, the above described method of presoaking a catalyst support material with a first liquid of low surface tension and then impregnating the presoaked support with a catalyst component dissolved in a second liquid of high surface tension and being substantially immiscible in the first liquid is not suitable for preparing skin catalysts, in which the active catalyst component is concentrated in the skin region of the catalyst (rather than "wasted" in the core region).

EXAMPLE II

This example illustrates the method in accordance of this invention of preparing skin catalysts by presoaking a catalyst support material with a first liquid of high surface tension and then impregnating the presoaked support material with a solution of the active catalyst component dissolved in a second liquid of low surface tension and also being substantially immiscible in the first liquid.

About 10 grams of alumina DD pellets were submersed in water at room temperature for several hours (e.g., overnight). The water penetrated completely to the core of the pellets as was observed after splitting of several pellets. The slurry was filtered, adhering water was removed by blotting with a paper towel, and the presoaked alumina pellets were heated with about 3 milliliters of a solution of palladium (II) acetate in dichloromethane (concentration: about 0.08 g $Pd(CH_3CO_2)_2$ per ml) on a hot plate, with stirring. After the solvent was evaporated, the impregnated pellets were dried for about 1 hour at about 200° F., preferably under vacuum conditions so as to minimize diffusion of Pd into the core during drying.

A hydrogen containing gas stream was passed over the dried, impregnated pellets at room temperature so as to reduce some $Pd^{+2}$ ions to Pd metal. The reduction was completed by heating the pellets for about 2 hours in a stream of hydrogen gas at about 450° C. Several catalyst pellets were split open and examined. Only a trace of Pd metal was detected in the core region of the pellets, and essentially all Pd was concentrated in the skin region, as is shown in FIG. 1.

It is essential that the presoaking liquid and the impregnating solution be substantially immiscible. A qualitative test was carried out using water for presoaking alumina pellets as described above and employing a solution of palladium acetate in dimethyl sulfoxide, which has a lower surface tension than water but is miscible with water, for impregnation. No skin distribution of Pd but a broad band of Pd extending into the core region was obtained.

EXAMPLE III

This example illustrates that the presoaking of a porous support material can be carried out with a high surface tension liquid other than water. Alumina pellets were submersed in ethylene glycol ($\gamma$ at 20° C.: about 48 dyne/cm). Excess ethylene glycol was removed from the pellets by blotting with a paper towel. The thus presoaked alumina pellets were then impregnated with a 0.8 weight-% solution of Pd acetate in toluene ($\gamma$ of toluene at 20° C.: about 28 dyne/cm; not appreciably soluble in ethylene glycol) for about 3 minutes. Cleavage of the alumina pellets revealed that the palladium was concentrated in the skin region of the pellets. This skin distribution obtained in this test was approximately as good as in pellets presoaked with water and then impregnated with the above described Pd acetate solution in toluene for about 5 minutes.

Another test revealed that presoaking of alumina pellets with ethylene glycol and subsequent impregnation with an aqueous solution of $PdCl_2$ resulted in a diffuse distribution of Pd in the pellets after about 20 minutes. This result was caused by two factors: water was miscible with ethylene glycol, and the surface tension of water was higher than that of ethylene glycol.

Thus a method which comprises presoaking a porous catalyst support material with a first liquid of high surface tension and impregnating the presoaked support material with a catalyst component, which is dissolved in a second liquid of lower surface tension and not substantially soluble with said first liquid, is effective in preparing skin catalysts having the active catalyst component concentrated in the skin region.

That which is claimed is:
1. A process for preparing a skin catalyst comprising;
   (a) immersing a porous support in a presoak liquid for a length of time sufficient to fill the interior of each support particle,
   (b) withdrawing the support particle of (a) and removing the excess liquid,
   (c) impregnating the support particles of (b) with an impregnating metal compound solution that is substantially immiscible with and has a surface tension that is at least about 5 dyne/cm @ 20° C. lower than the presoak liquid, and
   (d) drying and treating to activate the catalyst thereby producing a skin catalyst.
2. A process according to claim 1 wherein the dried catalyst is treated at an elevated temperature in a reducing atmosphere thereby producing a skin catalyst.
3. A process for preparing a skin catalyst according to claim 2 wherein the reducing atmosphere is hydrogen first at room temperature to reduce some metal ions then second at at least about 450° F. for at least about two hours to complete the metal reduction.
4. A process for preparing a skin catalyst according to claim 1 wherein the support particles are dried under vacuum.
5. A process for preparing a skin catalyst according to claim 1 wherein the support particles are alumina pellets at least about 1 mm in diameter.
6. A process for preparing a skin catalyst according to claim 1 wherein said presoak liquid has a surface tension at 20° C. of about 40-90 dyne/cm and said impregnating solution has a surface tension at 20° C. of about 15-60 dyne/cm.
7. A process for preparing a skin catalyst according to claim 1 wherein the presoak liquid has a surface tension at 20° C. of about 45-75 dyne/cm and the impregnating solution has a surface tension at 20° C. of about 20-35 dyne/cm.
8. A process for preparing a skin catalyst according to claim 7 wherein the impregnating solution is palladium (II) acetate in dichloromethane.
9. A process for preparing a skin catalyst according to claim 7 wherein said presoak liquid is water.
10. A process for preparing a skin catalyst comprising;
    (a) immersing alumina pellets in an aqueous presoak solution until the presoak solution has completely penetrated to the core,
    (b) filtering and removing excess liquid from the outside of the pellets,
    (c) impregnating the alumina pellets from (b) with a Group VIII metal containing impregnating solution that is both immiscible and has a lower surface tension than the aqueous solution,
    (d) evaporating the solvent of the impregnating solution,
    (e) drying the impregnated pellets at an elevated temperature under vacuum, and
    (f) treating the metal on the dried impregnated pellets in an atmosphere suitable to activate the catalyst.
11. A process according to claim 10 wherein the dried catalyst is treated at an elevated temperature in a reducing atmosphere thereby producing a skin catalyst.
12. A process according to claim 11 wherein the reducing atmosphere is hydrogen first at room temperature to reduce some metal ions then second at at least about 450° F. for at least about two hours to complete the metal reduction.

13. A process for preparing a skin catalyst according to claim 11 wherein said impregnating solution is palladium (II) acetate in dichloromethane and the reducing atmosphere is hydrogen.

14. A process for preparing a skin catalyst according to claim 10 wherein said presoak liquid has a surface tension at 20° C. of about 40-90 dyne/cm and said impregnating solution has a surface tension at 20° C. of about 15-60 dyne/cm.

15. A process for preparing a skin catalyst according to claim 14 wherein said presoak liquid is water.

16. A process for preparing a skin catalyst according to claim 14 wherein said impregnating solution is palladium (II) acetate in dichloromethane.

17. A catalyst prepared according to the process of claim 1.

18. A catalyst prepared according to the process of claim 13.

19. A process for preparing a skin catalyst the improvement which comprises:
(a) presoaking a porous support with a presoak liquid,
(b) impregnating with a metal containing impregnating solution that is not miscible with and has a lower surface tension than the presoak liquid.

20. A process for preparing a skin catalyst according to claim 1 wherein the metal is selected from the transition metals in the subgroups III B, IV B, V B, VI B, VII B, VIII, I B and II B of the Periodic Table of the Elements.

21. A process for preparing a skin catalyst according to claim 4 wherein the support particles are dried under vacuum at at least about 200° F. for at least about one hour.

* * * * *